(12) United States Patent
Sugawara et al.

(10) Patent No.: US 10,286,949 B2
(45) Date of Patent: May 14, 2019

(54) ELECTRIC POWER STEERING APPARATUS

(71) Applicant: NSK LTD., Tokyo (JP)

(72) Inventors: Takayoshi Sugawara, Tokyo (JP); Hideki Sawada, Tokyo (JP); Ryo Minaki, Tokyo (JP)

(73) Assignee: NSK LTD., Tokyo (JP)

( * ) Notice: Subject to any disclaimer, the term of this patent is extended or adjusted under 35 U.S.C. 154(b) by 0 days.

(21) Appl. No.: 15/751,315

(22) PCT Filed: Sep. 15, 2016

(86) PCT No.: PCT/JP2016/077311
§ 371 (c)(1),
(2) Date: Feb. 8, 2018

(87) PCT Pub. No.: WO2017/047708
PCT Pub. Date: Mar. 23, 2017

(65) Prior Publication Data
US 2018/0229764 A1    Aug. 16, 2018

(30) Foreign Application Priority Data

Sep. 18, 2015 (JP) ................................. 2015-185871
Jan. 22, 2016 (JP) ................................. 2016-010958

(51) Int. Cl.
*B62D 5/04* (2006.01)
*B62D 6/10* (2006.01)
(Continued)

(52) U.S. Cl.
CPC .......... *B62D 5/0487* (2013.01); *B62D 5/043* (2013.01); *B62D 5/049* (2013.01); *B62D 5/0484* (2013.01);
(Continued)

(58) Field of Classification Search
USPC .............................. 318/724, 400.07, 400.15
See application file for complete search history.

(56) References Cited

U.S. PATENT DOCUMENTS

| 2011/0074333 A1 | 3/2011 | Suzuki |
| 2014/0207335 A1* | 7/2014 | Mikamo ................ B62D 5/046 701/41 |

(Continued)

FOREIGN PATENT DOCUMENTS

| JP | 03239186 A | 10/1991 |
| JP | 11075394 A | 3/1999 |

(Continued)

OTHER PUBLICATIONS

International Preliminary Report on Patentability of PCT/JP2016/077311 dated Aug. 22, 2017.

(Continued)

*Primary Examiner* — Jorge L Carrasquillo
(74) *Attorney, Agent, or Firm* — Sughrue Mion, PLLC (57) ABSTRACT

[Problem]
An object of the present invention is to provide an electric power steering apparatus that can perform an angle estimating by using a motor regenerative current so as to accurately perform an angle estimating even in a low speed steering.
[Means for Solving the Problem]
The present invention is the electric power steering apparatus that calculates a current command value based on at least a steering torque, driving-controls a motor, which applies an assist torque to a steering system based on the current command value, by an inverter with respective phase duties of a PWM, and detects an angle of the steering system or the motor, comprising: an angle estimating section to estimate the angle when a detecting system of the angle is failed, wherein the electric power steering apparatus performs an assist-control based on an estimating angle that is estimated (Continued)

at the angle estimating section. The present invention can be also adapted to the control of the motor having multi-system windings.

17 Claims, 9 Drawing Sheets

(51) Int. Cl.
    *H02P 27/08* (2006.01)
    *H02P 29/028* (2016.01)
    *H02P 6/18* (2016.01)
    *H02P 6/17* (2016.01)
    *H02P 25/22* (2006.01)

(52) U.S. Cl.
    CPC ............... *B62D 6/10* (2013.01); *H02P 6/18* (2013.01); *H02P 27/085* (2013.01); *H02P 29/028* (2013.01); *H02P 6/17* (2016.02); *H02P 25/22* (2013.01)

(56) References Cited

U.S. PATENT DOCUMENTS

| | | | |
|---|---|---|---|
| 2014/0368150 A1* | 12/2014 | Furukawa | B62D 5/0403 318/564 |
| 2015/0375959 A1* | 12/2015 | Agirman | B66B 1/302 187/247 |
| 2017/0297616 A1* | 10/2017 | Kikuchi | B62D 5/0487 |

FOREIGN PATENT DOCUMENTS

| | | | | |
|---|---|---|---|---|
| JP | 2004215466 A | 7/2004 | | |
| JP | 2005-349860 A | 12/2005 | | |
| JP | 2006025587 A | 1/2006 | | |
| JP | 2008-049773 A | 3/2008 | | |
| JP | 2008087756 A | 4/2008 | | |
| JP | 2010-070037 A | 4/2010 | | |
| JP | 2011-078230 A | 4/2011 | | |
| JP | 2011078230 A | * 4/2011 | ........... B62D 5/0403 |
| JP | 5168057 B2 | 3/2013 | | |
| JP | 2013201828 A | 10/2013 | | |
| JP | 2014-087213 A | 5/2014 | | |
| JP | 2014138530 A | 7/2014 | | |
| JP | 5614598 B2 | 10/2014 | | |
| JP | 2015039256 A | 2/2015 | | |
| WO | 0173448 A1 | 10/2001 | | |
| WO | 2015019652 A1 | 2/2015 | | |

OTHER PUBLICATIONS

International Search Report of PCT/JP2016/077311 dated Dec. 6, 2016.

* cited by examiner

FIG.1

PRIOR ART

FIG.2

PRIOR ART

FIG.3

PRIOR ART

FIG.4

PRIOR ART

ELECTRIC POWER STEERING APPARATUS

CROSS REFERENCE TO RELATED APPLICATIONS

This application is a National Stage of International Application No. PCT/JP2016/077311 filed Sep. 15, 2016, claiming priority based on Japanese Patent Application No. 2015-185871 filed Sep. 18, 2015 and Japanese Patent Application No. 2016-010958 filed Jan. 22, 2016, the contents of all of which are incorporated herein by reference in their entirety.

TECHNICAL FIELD

The present invention relates to an electric power steering apparatus that applies an assist torque to a steering system of a vehicle by a motor by means of a current command value calculated based on at least a steering torque, and in particular to the electric power steering apparatus, for a brushless motor to be necessary to control by obtaining a motor rotational angle, that continues to assist-control by accurately estimating the motor rotational angle when an angle detecting system is failed (including an abnormality).

BACKGROUND ART

An electric power steering apparatus (EPS) which provides a steering system of a vehicle with a steering assist torque (an assist torque) by a rotational torque of a motor, applies the steering assist torque to a steering shaft or a rack shaft by means of a transmission mechanism such as gears by using a driving force of the motor which is controlled by electric power supplied from an electric power supplying section (an inverter). In order to accurately generate the steering assist torque, such a conventional electric power steering apparatus performs a feed-back control of a motor current. The feed-back control adjusts a voltage supplied to the motor so that a difference between a steering assist command value (a current command value) and a detected motor current value becomes small, and the adjustment of the voltage supplied to the motor is generally performed by an adjustment of duty command values of a pulse width modulation (PWM) control.

Figure 1:
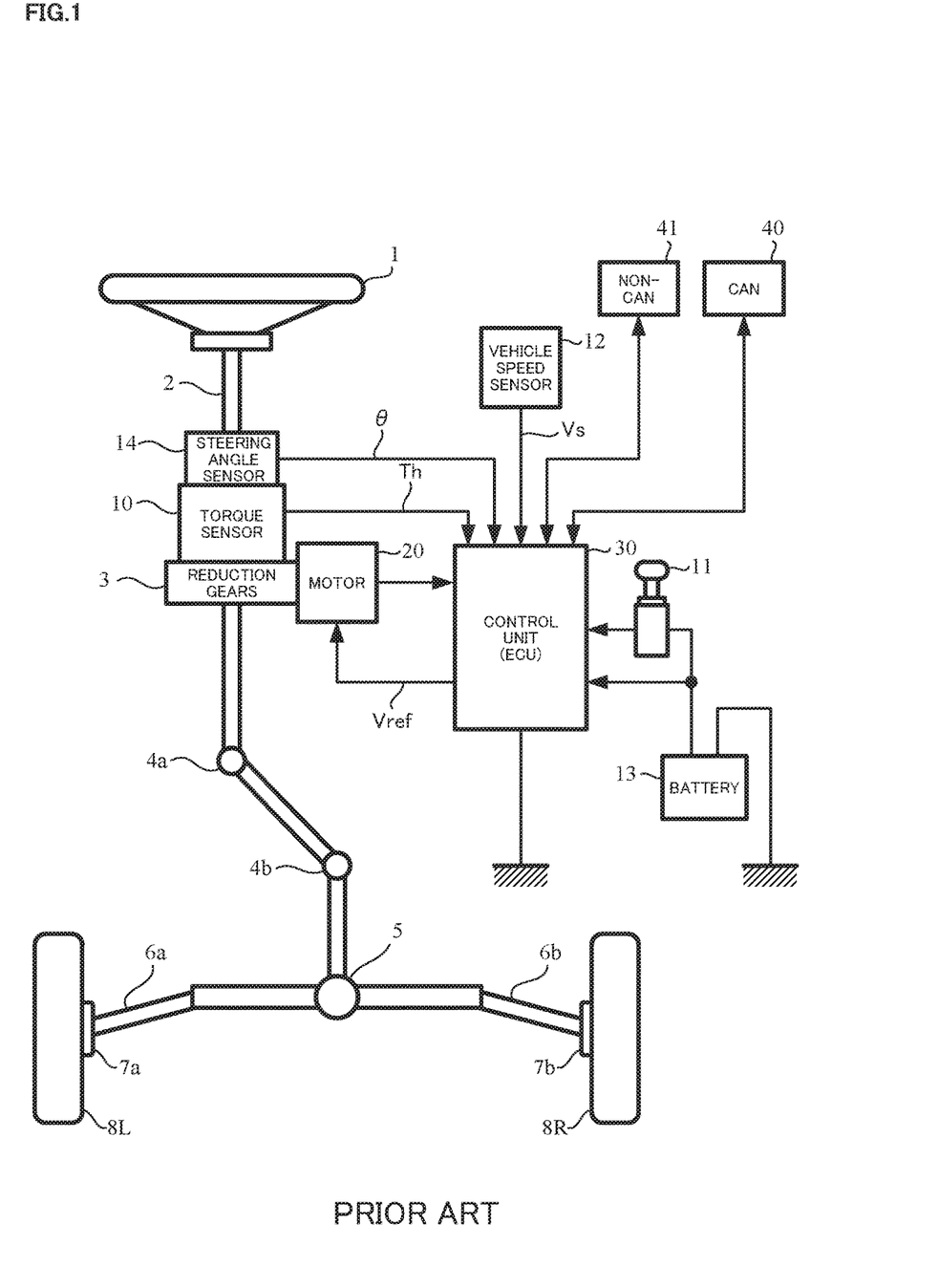
FIG. 1 is a configuration diagram showing a general outline of an electric power steering apparatus.

A general configuration of the conventional electric power steering apparatus will be described with reference to FIG. 1. As shown in FIG. 1, a column shaft (a steering shaft or a handle shaft) 2 connected to a handle 1 is connected to steered wheels 8L and 8R through reduction gears 3, universal joints 4a and 4b, a pinion-and-rack mechanism 5, and tie rods 6a and 6b, further via hub units 7a and 7b. In addition, the steering shaft 2 is provided with a torque sensor 10 for detecting a steering torque Th of the handle 1 and a steering angle sensor 14 for detecting a steering angle θ, and a motor 20 for assisting the steering torque of the handle 1 is connected to the column shaft 2 through the reduction gears 3. The electric power is supplied to a control unit (ECU) 30 for controlling the electric power steering apparatus from a battery 13, and an ignition key signal is inputted into the control unit 30 through an ignition key 11. The control unit 30 calculates a current command value of an assist command (a steering assist command) on the basis of the steering torque Th detected by the torque sensor 10 and a vehicle speed Vs detected by a vehicle speed sensor 12, and controls a current supplied to the motor 20 for the EPS by means of a voltage control command value Vref obtained by performing a compensation or the like to the current command value.

As well, the steering angle θ is detected from the steering angle sensor 14, and it is possible to obtain the steering angle from a rotational sensor such as a resolver which is connected to the motor 20.

A controller area network (CAN) 40 to send/receive various information and signals on the vehicle is connected to the control unit 100, and it is also possible to receive the vehicle speed Vel from the CAN 40. Further, a Non-CAN 41 is also possible to connect to the control unit 30, and the Non-CAN 41 sends and receives a communication, analogue/digital signals, electric wave or the like except for the CAN 40.

Figure 2:
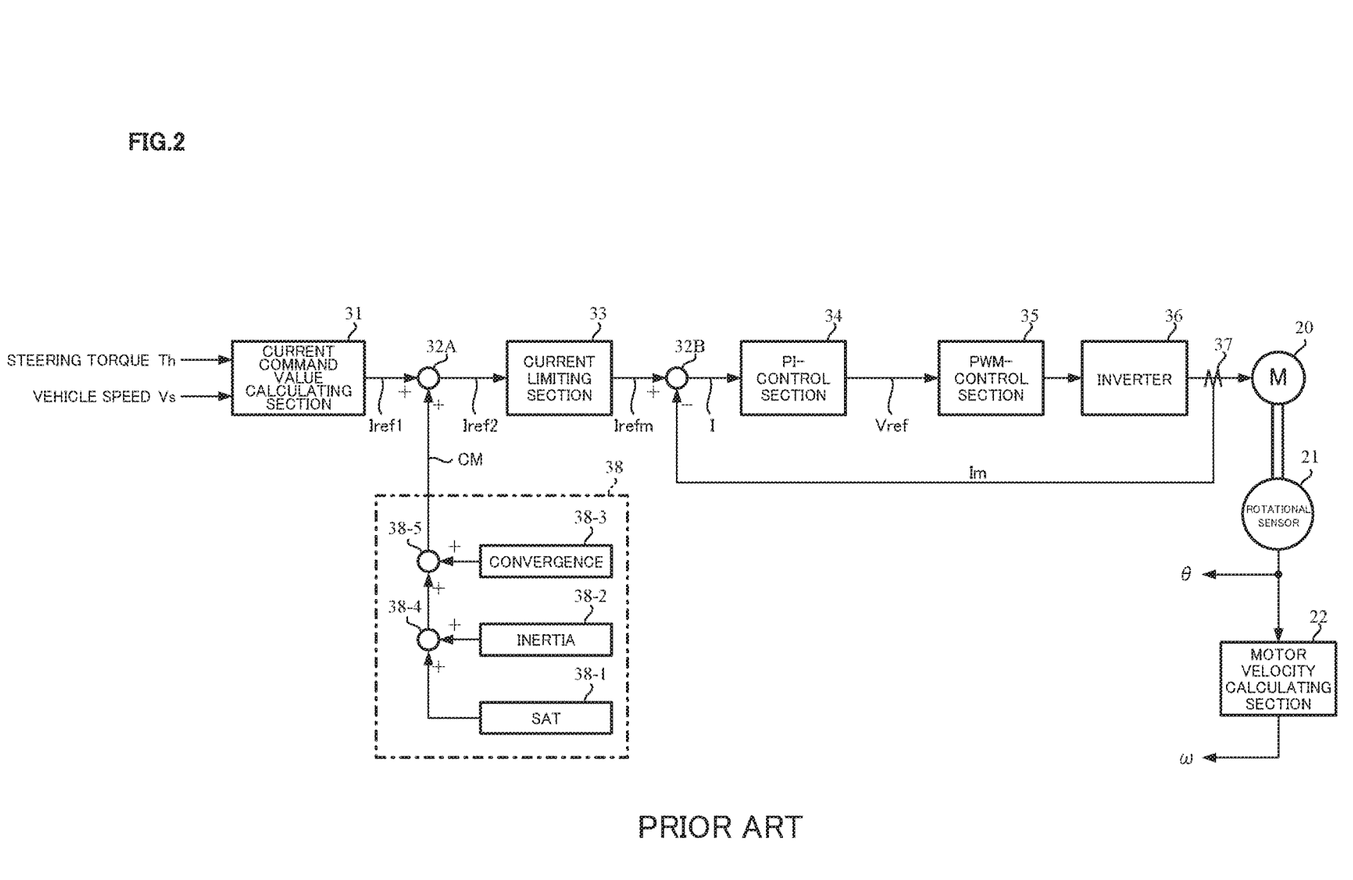
FIG. 2 is a block diagram showing a configuration example of a control unit (ECU) of the electric power steering apparatus.

The control unit 30 mainly comprises a CPU (Central Processing Unit) (including an MPU (Micro Processor Unit) and an MCU (Micro Controller Unit)), and general functions performed by programs within the CPU are, for example, shown in FIG. 2.

The control unit 30 will be described with reference to FIG. 2. As shown in FIG. 2, the steering torque Th detected by the torque sensor 10 and the vehicle speed Vs detected by the vehicle speed sensor 12 (or from the CAN 40) are inputted into a current command value calculating section 31 which calculates the current command value Iref1. The current command value calculating section 31 calculates the current command value Iref1, based on the steering torque Th and the vehicle speed Vs with reference to an assist map or the like, which is a control target value of a current supplied to the motor 20. The calculated current command value Iref1 is inputted into a current limiting section 33 via an adding section 32A, and the current command value Irefm whose maximum current is limited is inputted into a subtracting section 32B. A deviation I (=Irefm−Im) between the current command value Irefm and a motor current value Im which is fed-back is calculated at the subtracting section 32B, and the deviation I is inputted into a proportional-integral-control section (PI-control section) 34 for improving a current characteristic of the steering operation. The voltage control command value Vref that the characteristic is improved at the PI-control section 34, is inputted into a PWM-control section 35, and the motor 20 is PWM-driven through an inverter 36. The current value Im of the motor 20 is detected by a motor current detector 37 and is fed-back to the subtracting section 32B. The inverter 36 is constituted by a bridge circuit of field-effect transistors (FETs) as a semi-conductor switching device.

The rotational sensor 21 such as the resolver is connected to the motor 20 and a motor rotational angle θ is outputted. Further, a motor velocity ω is calculated at a motor velocity calculating section 22.

Further, a compensation signal CM from a compensation signal generating section 38 is added at the adding section 32A. A characteristic compensation of the steering system is performed by adding the compensation signal CM, and a convergence, an inertia characteristic, and the like are improved. The compensation signal generating section 38 adds a self-aligning torque (SAT) 38-1 to an inertia 38-2 at an adding section 38-4. The adding result is further added with a convergence 38-3 at an adding section 38-5. The adding result at the adding section 38-5 is treated as the compensation signal CM.

Figure 3:
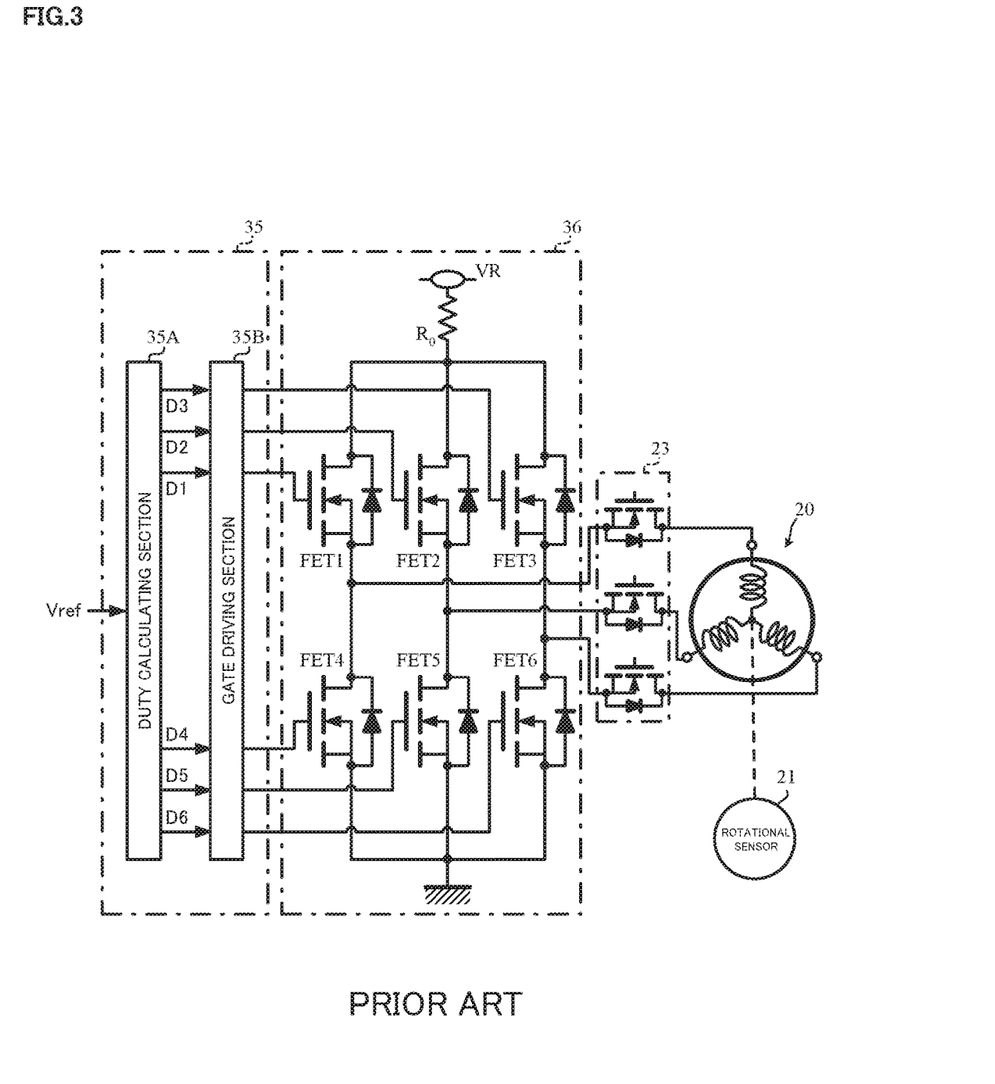
FIG. 3 is a wiring diagram showing a configuration example of a motor control section of the electric power steering apparatus.

In a case that the motor 20 is a three-phase brushless motor, details of the PWM-control section 35 and the inverter 36 have a configuration as shown in FIG. 3, and the PWM-control section 35 comprises a duty calculating section 35A that calculates the PWM-duty values D1 to D6 which are used in a three-phase PWM-control by using the voltage control command value Vref in accordance with a predetermined equation, and a gate driving section 35B that drives gates of the FETs as the driving device by means of the PWM-duty values D1 to D6 and turns-ON or turns-OFF the gates of the FETs for compensating a dead time. The inverter 36 is constituted by the three-phase bridge of the FETs (FET 1 to FET 6) as the semiconductor switching device, and the motor 20 is driven by turning-ON or turning-OFF the gates of the FETs with the PWM-duty values D1 to D6. Motor relays 23 for supplying (ON) the electric power or blocking off (OFF) the electric power are connected to respective phases in the electric power source lines between the inverter 36 and the motor 20.

When the motor current is not accurately controlled in the electric power steering apparatus which uses such a brushless motor, the generated torque by the motor cannot be accurately obtained. Thus, the sensor which precisely detects the motor angle is required. The resolver, a Hall sensor, a magneto resistive sensor (an MR sensor) and the like are used as the angle sensor, and any of the above sensors have a function that detects the motor angle with a required accuracy.

Figure 4:
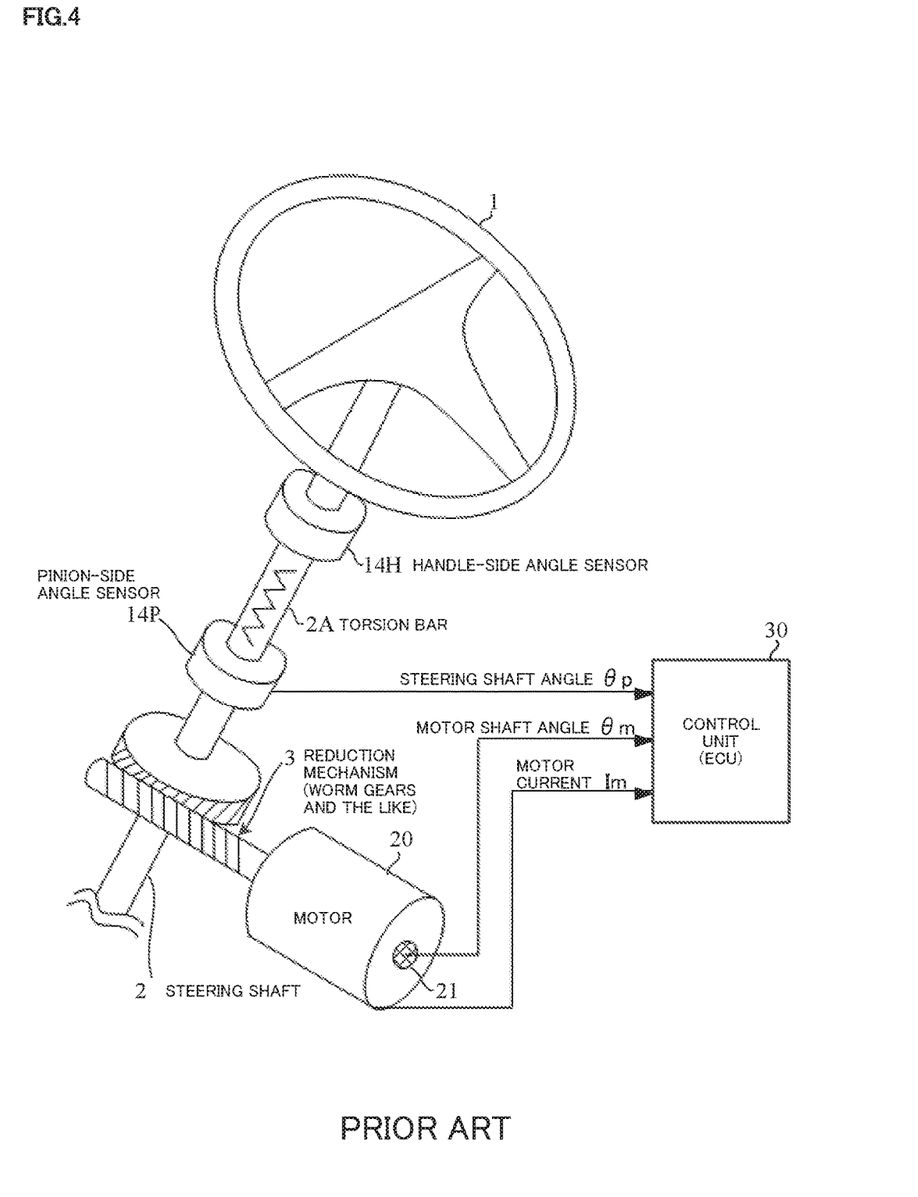
FIG. 4 is a schematic diagram showing an overall configuration of an angle detecting system.

FIG. 4 shows an overall configuration of an angle detecting system, and a torsion bar 2A is provided with the steering shaft (the column shaft) 2 which is connected to the handle 1. A handle-side angle sensor 14H is disposed at the handle 1 side of the torsion bar 2A and a pinion-side angle sensor 14P is disposed at the pinion side of the torsion bar 2A. The rotational sensor 21 such as the resolver is attached to the motor 20 which is provided with the steering shaft 2 through the reduction gears 3. A pinion-side angle θp detected at the pinion-side angle sensor 14P, a motor angle θm detected from the rotational sensor 21 and a motor current Im detected at a current detecting circuit are inputted into the control unit 30.

However, the electric power steering apparatus using the brushless motor is used to the vehicles which have a relatively large rack thrust force due to reasons of a high motor efficiency and so on. Therefore, since it is impossible to control the motor current when the motor angle sensor is failed, there is a problem that the assist function is failed and the driver feels a quite different steering feeling relative to the steering feeling in a normal operation. Further, since the failure of the assist function means that the force assisted by the motor till then is suddenly lost, the driver receives a force, which is corresponding to the assist force of the motor, as a sudden reaction force from the handle. This causes the driver to receive an impact from the handle. In a case that the impact is in a range to be controlled by the driver, the problem is small. Reversely, in a case that the impact is out of the range to be controlled by the driver, since not only an influence to the driver, but also the influence to the vehicle behavior can be occurred, this can cause the problem of the safety.

In this connection, the electric power steering apparatus adopting the brushless motor is strongly required to be equipped with an alternative means which can perform the angle detection even when the angle sensor of the motor is failed.

THE LIST OF PRIOR ART DOCUMENTS

Patent Documents

Patent Document 1: Japanese Patent No. 5614598 B2
Patent Document 2: Japanese Patent No. 5168057 B2

SUMMARY OF THE INVENTION

Problems to be Solved by the Invention

Conventionally, the angle (the electrical angle) of the motor is estimated by monitoring and calculating, in the ECU, a motor back-EMF which is mainly generated when the motor is rotated. However, there are problems that it is difficult to obtain a sufficient voltage amplitude in the low speed steering region by using the motor back-EMF, the angle estimating is difficult in a steering holding state or the low speed steering state (for example, 100 [deg/s] or less) and an erroneous angle is estimated. Consequently, the angle estimating has been performed by means of complicate operations such that an operation is performed so as to generate the motor rotational number to obtain the sufficient motor back-EMF by intentionally flowing the current to the motor in order for the motor back-EMF to have the sufficient amplitude, or an operation is performed so as to measure the amplitude and the phase (the vector) of the flowing motor current by applying a high frequency voltage (200 [Hz] and the like) to stators of the motor and by utilizing an inductance difference at a d-axis and a q-axis in the vector control.

However, the motor structure is not manufactured on the assumption that the angle estimating is performed. Thus, even when these estimating means are used, the problems that the influences of a deterioration of the estimating accuracy, the erroneous estimating and the like are significant in the low speed steering region and a state which the sufficient steering assist current is flowed, and the driver feels the quite different steering feeling compared with the normal operation of the motor angle sensor, are remained.

The present invention has been developed in view of the above-described circumstances, and an object of the present invention is to provide the electric power steering apparatus that can perform the angle estimating by using a motor regenerative current so as to accurately perform the angle estimating even in the low speed steering.

Means for Solving the Problems

The present invention relates to an electric power steering apparatus that calculates a current command value based on at least a steering torque, driving-controls a motor, which applies an assist torque to a steering system based on the current command value, by an inverter with respective phase duties of a pulse width modulation (PWM), and detects an angle of the steering system or the motor, the above-described object of the present invention is achieved by that comprising: an angle estimating section to estimate the angle when a detecting system of the angle is failed, wherein the electric power steering apparatus performs an assist-control based on an estimating angle that is estimated at the angle estimating section.

The above-described object of the present invention is efficiently achieved by that: wherein the angle estimating section fixes the respective phase duties to 0% or 100% in order to detect a regenerative current of the motor; or wherein fixed duties are 0% in a case that a motor current detecting circuit is connected to lower-stage switching devices of the inverter; or wherein fixed duties are 100% in a case that a motor current detecting circuit is connected to upper-stage switching devices of the inverter; or wherein fixed duties are selected from 0% or 100% in a case that a motor current detecting circuit is disposed on a motor phase; or wherein the angle estimating section detects a current of the motor while all of the respective phase duties are fixed; or wherein the angle estimating section estimates the angle from a detected motor current; or wherein the angle estimating section corrects an estimating angle from a rotational direction of a steering shaft angle; or wherein the angle estimating section uses a sign of the steering torque or a sign of a differential value of the steering torque instead of a rotational direction of a steering shaft angle; or wherein fixed time of the respective phase duties is changeable depending on circumstances such as a steering velocity and an assist torque; or wherein the angle estimating section drives the motor by passing a current to the motor in a circumstance that the motor is not entirely rotated and in a case that an angle estimating is indefinite, and just after performs an angle estimating by detecting a current by means of fixing the respective phase duties.

The present invention relates to an electric power steering apparatus that calculates a current command value based on at least a steering torque, driving-controls a motor, which has dual-system windings and applies an assist torque to a steering system based on the current command value, by respective system inverters with respective phase duties of a pulse width modulation (PWM), and detects an angle of the steering system or the motor, the above-described object of the present invention is achieved by that comprising: an angle estimating section for respective systems to estimate the angle when a detecting system of the angle is failed, wherein the electric power steering apparatus performs assist-control for respective systems based on an estimating angle that is estimated at the angle estimating section.

The above-described object of the present invention is efficiently achieved by that: wherein the angle estimating section of the respective systems fixes the respective phase duties to 0% or 100% in order to detect a regenerative current of the dual-system windings; or wherein fixed duties are 0% in a case that a motor current detecting circuit is connected to lower-stage switching devices of the respective system inverters; or wherein fixed duties are 100% in a case that a motor current detecting circuit is connected to upper-stage switching devices of the respective system inverters; or wherein fixed duties are selected from 0% or 100% in a case that a motor current detecting circuit is disposed on a motor phase; or wherein the assist-control is performed by dual-systems and one system stops the assist-control only when an angle estimating is required; or wherein a deficient assist amount while the assist-control is performed by one system and an angle estimating is performed by the other system, is compensated by increasing an assist amount of the one system which performs the assist-control; or wherein a motor release relay controls a turning-ON or a turning-OFF such that a regenerative current of a system which performs an angle estimating is not excess; or wherein a duty fixed mode and a zero ampere [A] control alternately switches with a high speed such that a regenerative current of a system which performs an angle estimating is not excess; or wherein one system which performs the assist-control generates an assist torque so as to cancel each other a brake torque that is generated from the other system which performs an angle estimating; or wherein in a case that an influence of dead times of the respective system inverters is not considered, fixed duties are not limited, three phases have a same duty and the duties have an amount to measure a required current value.

Effects of the Invention

According to the electric power steering apparatus in accordance with the present invention, since the angle estimating which uses the motor regenerative current is performed, the accurate angle estimating can be performed even in the low speed steering. Thereby, even when the angle detecting system is failed, it is possible to continue the assist-control.

BRIEF DESCRIPTION OF THE DRAWINGS

In the accompanying drawings.

MODE FOR CARRYING OUT THE INVENTION

In a case that a brushless motor is used to a driving device of an electric power steering apparatus (EPS), it is necessary to obtain a motor rotational angle in order to generate an accurate motor torque. Normally, the angle is detected by using a resolver, a Hall sensor, a magneto resistive sensor (an MR sensor) and the like. Therefore, in a case that these angle detecting means are failed (including an abnormality), since the electric power steering apparatus cannot generate the accurate motor torque, there is a problem that a steering assist function which is a main function of the electric power steering apparatus cannot be continued.

In this connection, in the present invention, even when an angle detecting system including an angle sensor is failed, an angle estimating means to estimate the angle is disposed, and a steering assist function is continued by using an estimating angle. A concrete means of the angle estimating intentionally sets to fix all of duty command values in U-phase, V-phase and W-phase to "0%" at timing when a failure of the angle sensor is occurred and an angle estimating is required. This means that: it is an object to avoid an instability state (a divergence of a yaw rate, an increase of a sudden steering torque during a turning, an occurrence of a sudden lateral acceleration and so on) of a vehicle behavior due to a changing of a sudden steering velocity by applying a damping component to a steering system by means of setting the motor to an electromagnetic brake mode, and to perform the angle estimating by accurately and immediately detecting a regenerative current, at an ECU, which is generated by rotating the motor. The above case that all phases of the duties are fixed to 0% is a case that a current detecting method is a downstream shunt method in the ECU. In a case that the current detecting method is an upstream shunt method in the ECU, it is possible to apply the damping and to detect the regenerative current by fixing the all phases of the duties to 100%. Further, in a case that the current detecting method is a phase current detecting method in the ECU, it may fix the all phases of the duties to 0% or 100%.

When the angle estimating is completed, the all phases whose duties are fixed to 0% are released, the assist control equivalent to a normal operation is performed based on the estimated angle information instead of the angle information of the angle sensor, and the assist function is continued. Since the angle information is not obtained while the assist function is continued, the angle estimating (the duties are fixed to 0% or 100%) and the assist control alternately is repeated, and then it is possible to perform the assist control during performing the angle estimating.

In the present invention, in order to accurately perform the angle estimating even in the low speed steering, the angle estimating by using the motor regenerative current is performed at timing when the angle detecting system is failed. This method utilizes the fact that an internal impedance (a resistance component) of the ECU and impedances (resistance components) of motor windings are sufficiently low. Normally, since the impedances of the ECU and the motor are about 10 [mΩ], it is possible to obtain a sufficient detecting current value even in the low speed steering region that the measuring is difficult as an amplitude of a motor back-EMF of the motor is too small, and to enable to accurately perform the angle estimating. In order to accurately detect the regenerative current of the motor at the ECU, it is necessary to keep all duties of the three phases to the same value. This reason is that an excessive current from the ECU to the motor is not passed and the ECU detects only the regenerative current. However, since a circuit configuration used in the normal motor driving is an inverter configuration that respective phases have two switching devices, a dead time serving as a guard time not to be short-circuited the two switching devices is set. This setting of the dead time causes a decrease in the accuracy of the current detecting. In order to prevent from a deterioration of the detecting accuracy due to the dead time, all duties of the three phases are fixed to 0% or 100%. This setting enables to eliminate the influence of the dead time.

However, it is necessary to keep in mind that optimal fixed duties are different depending on the detecting method of the motor current. For example, in a case that the current detecting device such as a shunt resistor for detecting the current is disposed adjacent to lower-stage switching devices, the duties are fixed to 0%, and all motor regenerative currents are flowed through the shunt resistor. On the contrary, in a case that the current detecting device is disposed adjacent to upper-stage switching devices, the duties are fixed to 100%.

Furthermore, in a case that the current detecting device is directly disposed on a motor phase between the upper-stage and the lower-stage, the duties may be fixed to 100% or 0%. By setting the above duties, even in the extremely slow steering speed (for example, 10 [deg/s] or less), it is possible to accurately detect the motor regenerative current and to estimate the electrical angle from a magnitude relationship of the three phase currents.

Embodiments according to the present invention will be described in detail with reference to the drawings.

Figure 5:
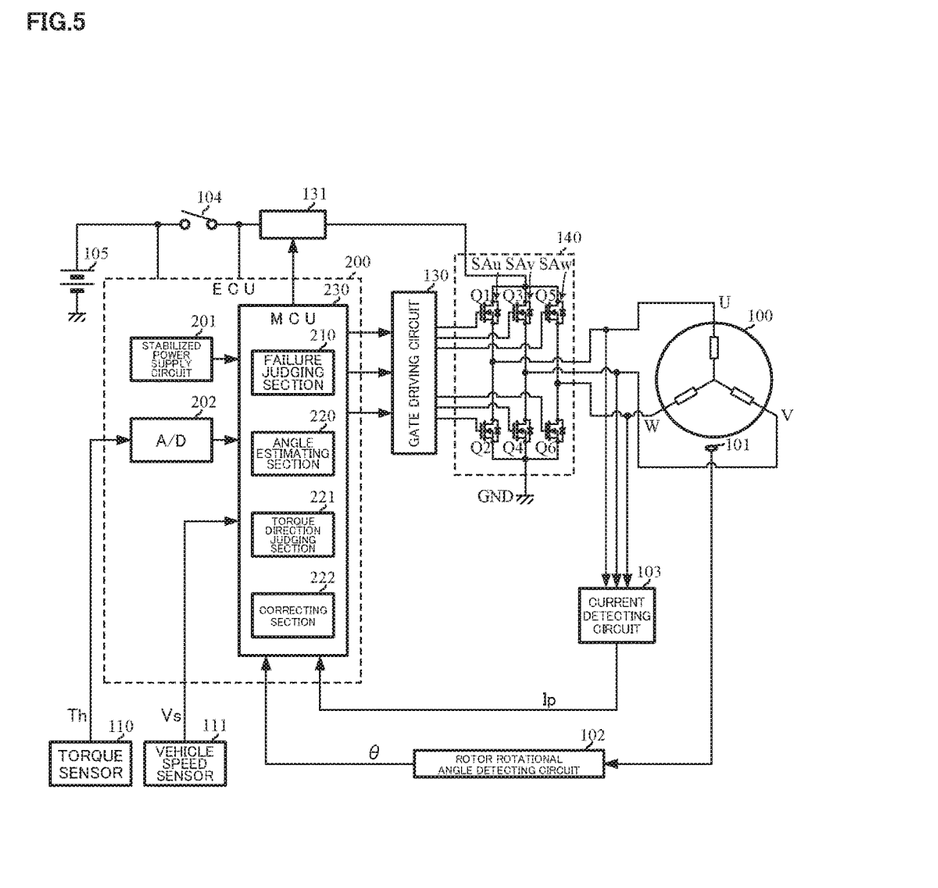
FIG. 5 is a block diagram showing a configuration example of the present invention.

FIG. 5 shows a configuration example of the present invention, and the angle detecting system is the same as that of FIG. 4. The ECU 200 comprises a micro controller unit (MCU) 230, a stabilized power source circuit 201, an analog/digital (A/D) converting section 202 and the like. The MCU 230 comprises functions of a failure judging section 210, an angle estimating section 220, a torque direction judging section 221 and a correcting section 222. The ECU 200 inputs the calculated respective phase duties into a field-effect transistor (FET) gate driving circuit 130, and drives the motor 100 via the inverter 140. Electric power is supplied from a battery 105 to the inverter 140 via a switching section 131. The switching section 131 is turned-ON or turned-OFF by the ECU 200. The electric power is supplied from the battery 105 to the ECU 200, and an ignition key signal from an ignition key 104 is also inputted into the ECU 200 and the switching section 131.

The resolver 101 as a rotational sensor is connected to the rotor of the motor 100. A detecting signal from the resolver 101 is inputted into a rotor rotational angle detecting circuit 102, and the detected rotational angle θ is inputted into the ECU 200. The phase currents of the motor 100 are detected at the current detecting circuit 103, and the detected phase current Ip is inputted into the ECU 200. Further, the steering torque Th that is detected by the torque sensor 110 is converted into a digital value at the A/D converting section 202, the digital value is inputted into the MCU 230, and a vehicle speed Vs from a vehicle sensor 111 is inputted into the MCU 230.

Figure 6:
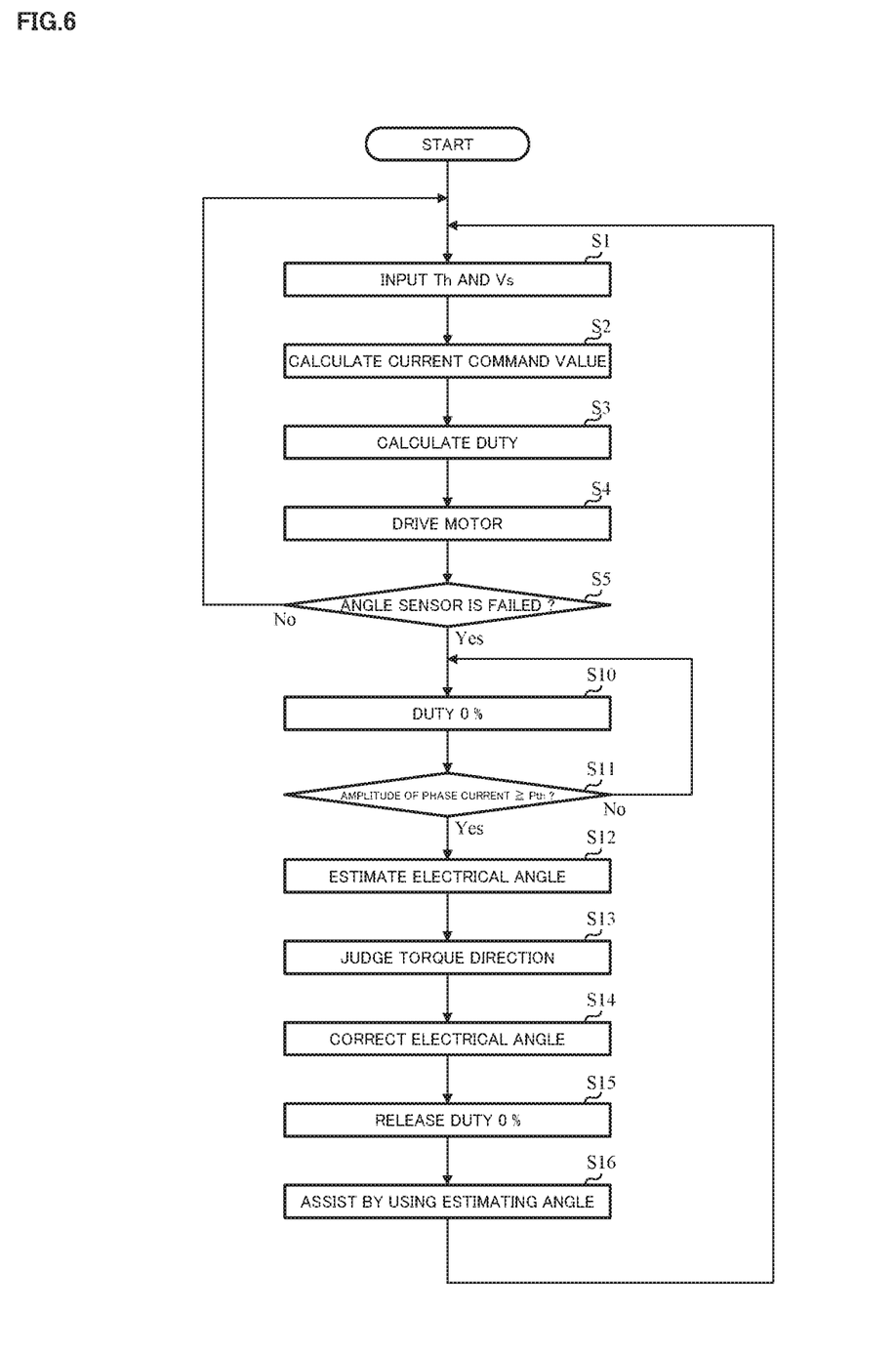
FIG. 6 is a flowchart showing an operation example of the present invention.

In such a configuration, an operation example will be described with reference to a flowchart of FIG. 6.

When the operation is started, the steering torque Th from the torque sensor 110 and the vehicle speed Vs from the vehicle speed sensor 111 are inputted into the ECU 200 (Step S1). The ECU 200 (the MCU 230) calculates the current command value based on the steering torque Th and the vehicle speed Vs (Step S2), and calculates the respective phase duties (Step S3). The motor 100 is driven through the gate driving circuit 130 and the inverter 140 (Step S4). In this assist control state, the phase current Ip is detected at the current detecting circuit 103 and the rotational angle θ is detected at the rotor rotational angle detecting circuit 102, and the detected phase current Ip and the detected rotational angle θ are respectively inputted into the ECU 200.

The failure judging section 210 in the MCU 230 judges whether the angle sensor (the resolver 101 and the like) is failed or not during performing the above assist-control (Step S5). The failure judging of the angle sensor (the resolver 101 and the like) is used to a general method that judges whether an equation "$\sin\theta^2 + \cos\theta^2 = 1$" is satisfied or not or the like. In a case that the failure is not occurred, the operation returns to the above Step S1 and iterates the above-described steps.

At the above Step S5, in a case that the failure judging section 210 judges that the failure is occurred at the angle sensor, the duties are fixed to 0% and the driving of the motor 100 is stopped (Step S10), and it is judged whether the amplitude of the phase current Ip detected by the current detecting circuit 103 is a threshold Pth or more or not (Step S11). In a case that the amplitude of the phase current Ip is less than the threshold Pth, the operation returns to the above Step S10. As well, the threshold Pth is set to a value that is larger than the amplitude of the noise of the current detecting value after the A/D conversion. By reducing the noise by means of the filter process and the like, the threshold Pth which is less than the above value can be set.

Figure 7:
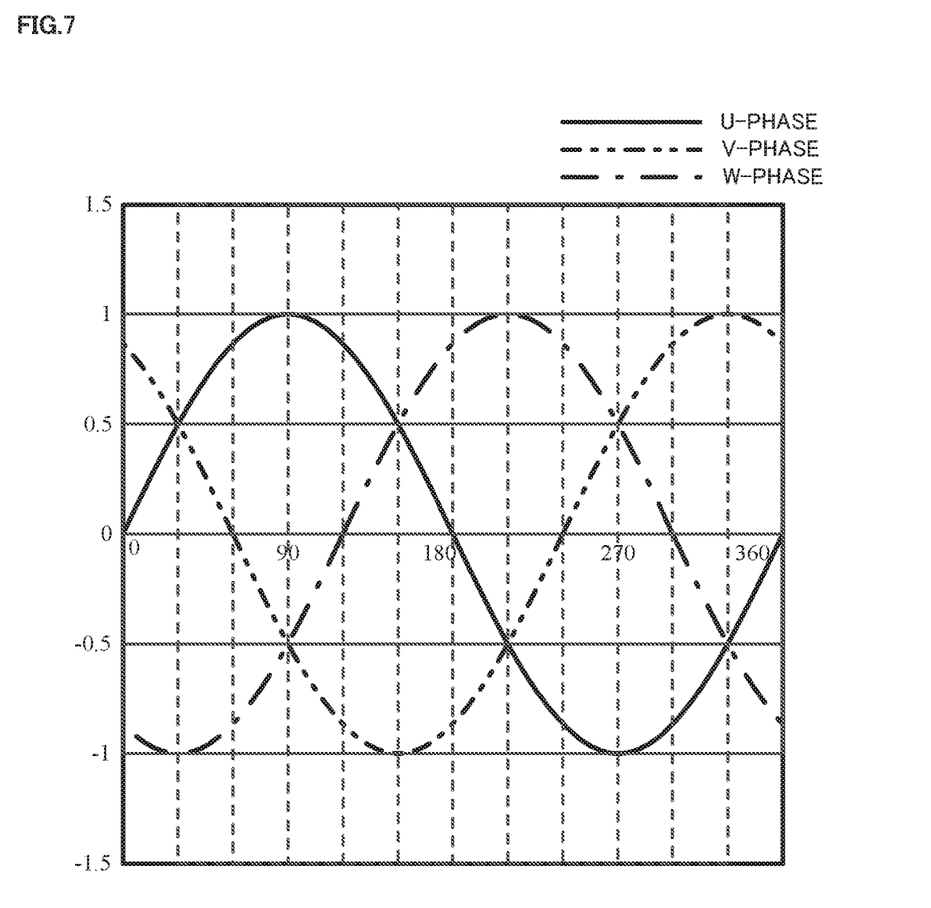
FIG. 7 is a characteristic diagram showing an example to estimate an electrical angle from phase currents.

At the above Step S11, in a case that it is judged that the amplitude of the phase current Ip is larger than or equal to the threshold Pth, the angle estimating section 220 in the MCU 230 estimates the electrical angle from the phase current Ip (Step S12). An embodiment for estimating the electrical angle from the phase current Ip has a characteristic as shown in FIG. 7. That is, for example, when the U-phase and the V-phase are a positive value and the W-phase is a negative value, the estimating angle is estimated in the range of 0° to 60°. More finely, when the V-phase is larger than the U-phase, the estimating angle is estimated in the range of 0° to 30°. On the contrary, when the U-phase is larger than the V-phase, the estimating angle is estimated in the range of 30° to 60°. Other angles can be similarly estimated at a 30°-pitch from the sign of the currents and the magnitude relationship among the currents by the similar procedure.

Next, the torque direction judging section 221 in the ECU 200 judges the torque direction applied to the motor 100 from the moving of the pinion-side angle (Step S13). Since the estimating angle estimated at the above Step S12 is shifted by 180° when the direction of the torque applied to (generated at) the motor 100 is reversed, the direction of the torque applied to the motor 100 is estimated from the varying direction (here, the varying direction of the angle means the rotational direction) of the steering shaft angle θp being the pinion-side angle (the output shaft angle) of the column shaft, and a 180°-correction is performed if necessary. For example, in a case that the steering shaft angle θp is rotated in a clock wise (CW) direction, since it means that the three phases of the motor 100 are short-circuited, the brake torque is generated against the CW rotation. Then, since the direction of this brake torque is a reverse direction of the rotational direction, the direction of the torque of the motor 100 is a counter clock wise (CCW) direction. Alternatively, in a case that the steering shaft angle θp is rotated in the CCW direction, the direction of the torque of the motor 100 is the CW direction.

The correcting section 222 in the MCU 230 corrects the estimating electrical angle from the direction of the torque which is judged at the torque direction judging section 221 (Step S14). When the direction of the torque of the motor 100 is reversed, the phase current of the motor 100 has a characteristic that a polarity is reversed. That is, the sign and the magnitude relationship of the phase currents are the same in cases that the motor torque in the CW direction is occurred at the angle 90° and the motor torque in the CCW direction is occurred at the angle 270°. Therefore, assuming that the relationship between the current and the angle, for example, as shown in FIG. 7 is the case that the direction of the torque generated from the motor 100 is the CW direction, in the case that the direction of the torque of the motor 100 is the CCW direction, it is possible to obtain a right angle by correcting the estimating angle by 180°-offset correction.

As described above, when the estimation and the correction of the electrical angle are completed, the ECU 200 releases that all of the respective phase duties are fixed to 0% (Step S15), and performs the normal assist-control by using the corrected estimating angle (Step S16).

In the above operation, although the current detecting circuit 103 is disposed on the motor phase and the duties are fixed to 0%, the duties may be fixed to 100%. In a case that the current detecting device such as the shunt resistor for detecting the current is disposed adjacent to the lower-stage FETs (Q2, Q4 and Q6) of the inverter 140, the duties are fixed to 0% and all motor regenerative currents are passed through the shunt resistor. On the contrary, in a case that the current detecting device is disposed adjacent to the upper-stage FETs (Q1, Q3 and Q5) of the inverter 140, the duties are fixed to 100%.

Further, the angle estimating section 220 may judge the torque direction by using the sign of the steering torque Th or the sign of the differential value of the steering torque Th instead of the steering shaft angle (pinion-side angle), and the fixed time (the time which is required for the angle estimating) of the respective phase duties is changeable depending on the steering velocity, the assist torque and the like. Furthermore, the angle estimating section 220 rotates the motor by passing the current to the motor 100 in a case that the motor 100 is not rotated and an angle estimating is indefinite, and just after may perform an angle estimating by detecting the current by means of fixing the respective phase duties.

Figure 8:
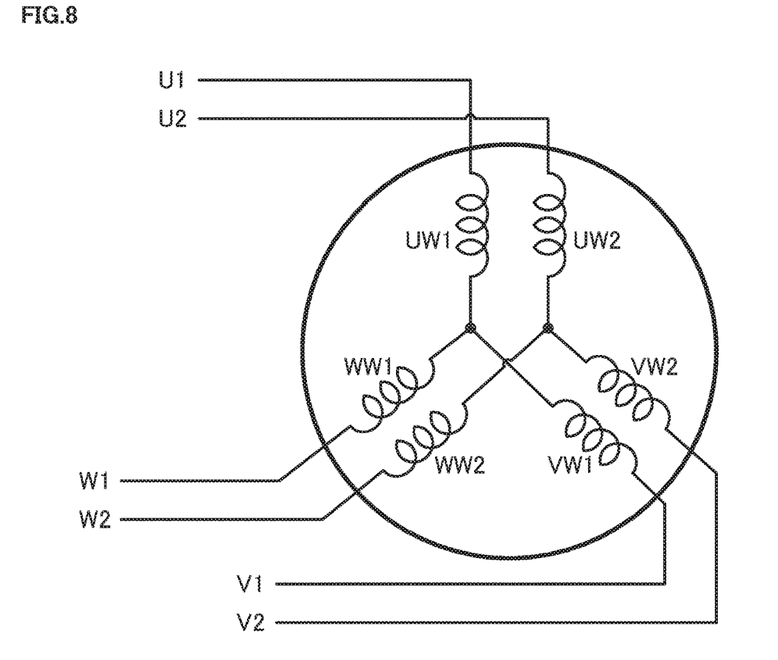
FIG. 8 is a connection diagram showing a motor having dual-system windings (Y-connection)
Figure 9:
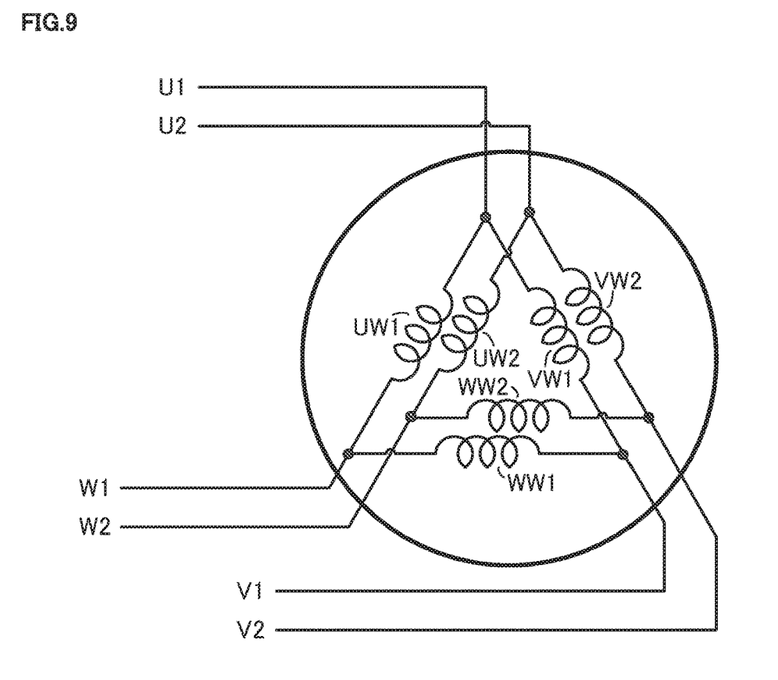
FIG. 9 is a connection diagram showing the motor having dual-system windings (delta-connection)

Recently, in order to enhance the security of the motor, the motor which has the multi-system motor windings is emerged. FIG. 8 shows the three-phase motor with a Y-connection. One system comprises the U-phase winding UW1, the V-phase winding VW1 and the W-phase winding WW1, and the other system comprises the U-phase winding UW2, the V-phase winding VW2 and the W-phase winding WW2. The motor is driven by passing the three-phase current through the windings UW1 to WW1 and the windings UW2 to WW2. FIG. 9 shows the three-phase motor with a delta-connection. One system comprises the U-phase winding UW1, the V-phase winding VW1 and the W-phase winding WW1, and the other system comprises the U-phase winding UW2, the V-phase winding VW2 and the W-phase winding WW2. The motor is driven by passing the three-phase current through the windings UW1 to WW1 and the windings UW2 to WW2.

Figure 10:
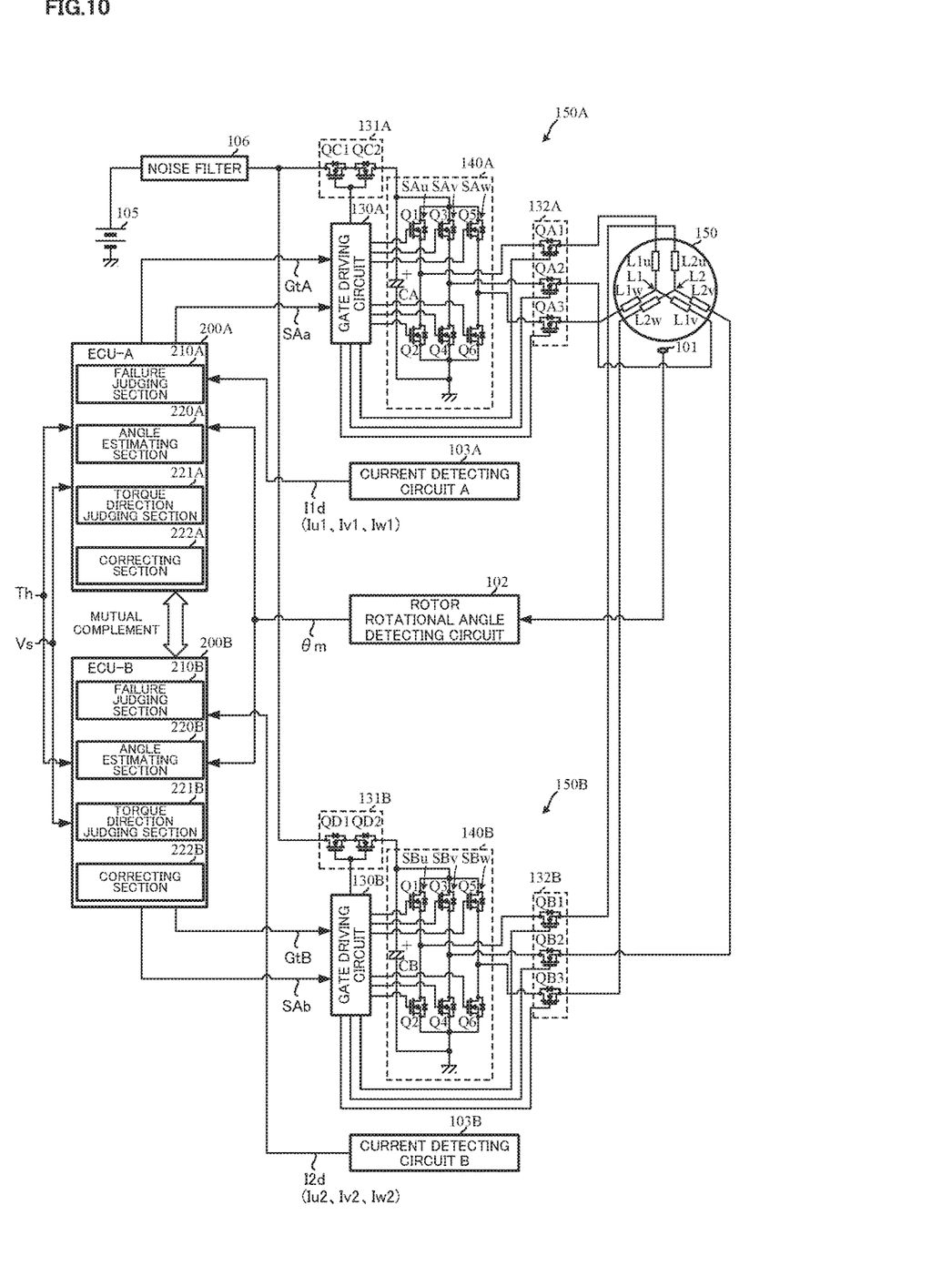
FIG. 10 is a block diagram showing a particular configuration example of the present invention to driving-control the motor having dual-system windings (Y-connection).

The present invention can be also adapted to the electric power steering apparatus that is driven by the motor which has such the multi-system windings. FIG. 10 shows a configuration example corresponding to FIG. 5. In the present embodiment, the driving-control of the motor 150 which has the dual-system windings with the Y-connection (L1: L1u to L1w, and L2: L2u to L2w) will be described.

The motor controlling section that drives the motor 150 which has the dual-system motor windings, comprises a control section 150A to driving-control the winding L1 (L1u to L1w), and a control section 150B to driving-control the winding L2 (L2u to L2w). The configuration of the control section 150A is the same as that of the control section 150B. The control sections 150A and 150B are controlled by the ECUs 200A and 200B, respectively. The ECUs 200A and 200B have the functions of at least the failure judging sections 210A and 210B, the angle estimating sections 220A and 220B, the torque direction judging sections 221A and 221B, and the correcting sections 222A and 222B, respectively.

The steering torque Th, the vehicle speed Vs and the rotational angle θ from the rotor rotational angle detecting circuit 102 are inputted into the ECUs 200A and 200B. The motor current I1d (Iu1, Iv1 and Iw1) detected from the respective coils of the first system motor winding L1 is inputted into the ECU 200A. The motor current I2d (Iu2, Iv2 and Iw2) detected from the respective coils of the second system motor winding L2 is inputted into the ECU 200B. A driving signal GtA of the duties which are calculated in the above manner at the ECU 200A is inputted into the gate driving circuit 130A. The driving signal GtB of the duties which are calculated at the ECU 200B is inputted into the gate driving circuit 130B. Further, a failure signal SAa which is judged at the failure judging section 210A in the ECU 200A is inputted into the gate driving circuit 130A, and a failure signal SAb which is judged at the failure judging section 210B in the ECU 200B is inputted into the gate driving circuit 130B.

Direct currents (DC) are supplied to the control sections 150A and 150B from the battery 105 as a DC power source through the noise filter 106 and power source blocking circuits 131A and 131B that are turned-ON or are turned-OFF by the gate driving circuits 130A and 130B, respectively. The power source blocking circuits 131A has a series circuit configuration that the source of the FET QC1 is connected to that of the FET QC2, and a connection direction of the parasitic diodes is opposite. The power source blocking circuits 131B has a series circuit configuration that the source of the FET QD1 is connected to that of the FET QD2, and the connection direction of the parasitic diodes is opposite. The drain of the FET QC1 is connected to that of the FET QD1 and both the drains are connected to an output side of the noise filter 106. The drain of the FET QC2 is connected to the sources of the FETs Q1, Q2 and Q3 of the inverter 122A. The drain of the FET QD2 is connected to the sources of the FETs Q1, Q2 and Q3 of the inverter 122B.

The power-source supplying sections of the inverters 140A and 140B are connected to electrolytic capacitors CA and CB for a power source smoothing in parallel, respectively. A motor release relay 132A, which comprises the FETs for the current blocking QA1, QA2 and QA3, is connected between the inverter 140A and the winding L1 of the motor 150. The motor release relay 132B, which comprises the FETs for the current blocking QB1, QB2 and QB3, is connected between the inverter 140B and the winding L2 of the motor 150. The FETs QA1 to QA3 of the motor release relay 132A and the FETs QB1 to QB3 of the motor release relay 132B are connected to the parasitic diodes D such that the connection direction is the same by connecting the cathodes to the inverter 140A side and the inverter 140B side, respectively.

When the failure of the angle detecting system is not judged and the failure signal SAa is not outputted, the ECU 200A drives the winding L1 of the motor 150 through the gate driving circuit 130A and the inverter 140A based on the calculated driving signal GtA. When the failure of the angle detecting system is not judged and the failure signal SAb is not outputted, the ECU 200B drives the winding L2 of the motor 150 through the gate driving circuit 130B and the inverter 140B based on the calculated driving signal GtB. Then, when the failure signal SAa is inputted from the ECU 200A to the gate driving circuit 130A, the gate driving circuit 130A fixes the duties to 0% or 100%, and controls that the power source blocking circuit 131A and the motor release relay 132A are turned-ON or turned-OFF as needed. When the failure signal SAb is inputted from the ECU 200B to the gate driving circuit 130B, the gate driving circuit 130B fixes the duties to 0% or 100%, and controls that the power source blocking circuit 131B and the motor opening relay 132B are turned-ON or turned-OFF as needed.

In a case of such a dual-system hardware configuration, one system can be exclusively used for the driving, and the other system can be exclusively used for estimating the angle from the motor current. Concretely, one system, by fixing the duties to 0% or 100%, always detects the motor current and continues to estimate the angle, and the other system performs the assist-control by using the estimated angle. In this manner, the configuration enables to perform the angle estimating and the assist-control, simultaneously, and the driver can feel smoother steering feeling. Further, since the motor of the system fixed the duties always generates the brake torque, in the system side to perform the assist control, it is possible to cancel the change of the steering feeling each other by generating the assist torque so as to cancel the brake torque each other. In addition, in order to avoid the deficiency of the assist and unnecessary viscous feeling due to the excess brake torque, it is also possible to control the steering by turning-ON or turning-OFF the motor release relay of the system fixed the duties so as not be the excess brake torque. Or, a similar effect can be obtained by fast and alternately switching between the duty fixed mode and the 0-ampere [A] control.

In a case of not considering the influence of the dead time of the inverters of the respective systems, the value of the fixed duties is not limited, the duties of the three phases are the same value, and the duties may be the value that the required current value can be measured.

EXPLANATION OF REFERENCE NUMERALS 1 handle
2A torsion bar
2 column shaft (steering shaft, handle shaft)
10, 110 torque sensor
12, 111 vehicle speed sensor
14H handle-side angle sensor
14P pinion-side angle sensor
20, 100, 150 motor
23 motor release switch
30, 200 control unit (ECU)
31 current command value calculating section
34 proportional-integral (PI) control section
35 pulse width modulation (PWM) control section
36, 140 inverter
101 resolver
102 rotor rotational angle detecting circuit
103 current detecting circuit
130 field-effect transistor (FET) gate driving circuit
210 failure judging section
220 angle estimating section
221 torque direction judging section
222 correcting section
230 MCU

The invention claimed is:

1. An electric power steering apparatus that calculates a current command value based on at least a steering torque, driving-controls a motor, which applies an assist torque to a steering system based on said current command value, by an inverter with respective phase duties of a pulse width modulation (PWM) via a gate driving circuit, detects phase currents of said motor via motor current detecting circuit, and detects an angle of said steering system or said motor, comprising:

a processor that is configured to execute at least one software section, comprising
an angle estimating section to fix said respective phase duties, detect currents and estimate said angle when a detecting system of said angle has failed,
wherein said angle estimating section fixes said respective phase duties to 0% or 100% depending on a connection relation between said motor current detecting circuit and said inverter or motor phases, detects a regenerative current of said motor via said motor current detecting circuit while all of said phase duties are fixed, and estimates said angle from said detected regenerative current, and wherein said electric power steering apparatus performs an assist-control based on an estimating angle that is estimated by said angle estimated section.

2. The electric power steering apparatus according to claim 1, wherein fixed duties are 0% in a case that a motor current detecting circuit is connected to lower-stage switching devices of said inverter.

3. The electric power steering apparatus according to claim 1, wherein fixed duties are 100% in a case that a motor current detecting circuit is connected to upper-stage switching devices of said inverter.

4. The electric power steering apparatus according to claim 1, wherein fixed duties are selected from 0% or 100% in a case that a motor current detecting circuit is disposed on a motor phase.

5. The electric power steering apparatus according to claim 1, wherein said angle estimating section corrects an estimating angle from a rotational direction of a steering shaft angle.

6. The electric power steering apparatus according to claim 1, wherein said angle estimating section uses a sign of said steering torque or a sign of a differential value of said steering torque instead of a rotational direction of a steering shaft angle.

7. The electric power steering apparatus according to claim 1, wherein a fixed time of said respective phase duties is changeable depending on circumstances such as a steering velocity and an assist torque.

8. The electric power steering apparatus according to claim 1, wherein said angle estimating section drives said motor by passing a current to said motor via said gate driving circuit in a circumstance that said motor is not rotated, and just after performs an angle estimating by detecting a current by means of fixing said respective phase duties.

9. An electric power steering apparatus that calculates a current command value based on at least a steering torque, driving-controls a motor, which has dual-system windings and applies an assist torque to a steering system based on said current command value, by respective system inverters with respective phase duties of a pulse width modulation (PWM) via respective gate driving circuits, detects phase currents of said motor via motor current detecting circuits of respective systems, and detects an angle of said steering system or said motor, comprising:

a processor that is configured to execute at least one software section, comprising an angle estimating section for respective systems to fix said respective phase duties, detect currents and estimate said angle when a detecting system of said angle is failed, wherein said angle estimating section of said respective systems fixes said respective phase duties to 0% or 100% depending on a connection relation between said motor current detecting circuits of said respective systems and said inverter of said respective systems or motor phases of said respective systems, detects a regenerative current of said motor via said motor current detecting circuits of said respective systems while all of said phase duties are fixed, and estimates said angle from said detected regenerative current, and wherein said electric power steering apparatus performs an assist-control for respective systems based on an estimating angle that is estimated by said angle estimating section.

10. The electric power steering apparatus according to claim 9, wherein fixed duties are 0% in a case that a motor current detecting circuit of said respective systems is connected to lower-stage switching devices of said respective system inverters.

11. The electric power steering apparatus according to claim 9, wherein fixed duties are 100% in a case that a motor current detecting circuit of said respective systems is connected to upper-stage switching devices of said respective system inverters.

12. The electric power steering apparatus according to claim 9, wherein fixed duties are selected from 0% or 100% in a case that a motor current detecting circuit of said respective systems is disposed on a motor phase of said respective system.

13. The electric power steering apparatus according to claim 9, wherein said assist-control is performed by dual-systems and one system stops said assist-control only when an angle estimating is required.

14. The electric power steering apparatus according to claim 9, wherein a deficient assist amount while said assist-control is performed by one system and an angle estimating is performed by other system, is compensated by increasing an assist amount of said one system which performs said assist-control.

15. The electric power steering apparatus according to claim 9, wherein a motor release relay controls a turning-ON or a turning-OFF such that a regenerative current of a system which performs an angle estimating is not excess.

16. The electric power steering apparatus according to claim 9, wherein a duty fixed mode and a zero ampere [A] control alternately switches with a high speed such that a regenerative current of a system which performs an angle estimating is not excess.

17. The electric power steering apparatus according to claim 9, wherein one system which performs said assist-control generates an assist torque so as to cancel each other a brake torque that is generated from the other system which performs an angle estimating.

* * * * *